United States Patent [19]
De Vaan et al.

[11] Patent Number: 6,042,237
[45] Date of Patent: Mar. 28, 2000

[54] IMAGE PROJECTION MODULE AND IMAGE PROJECTION DEVICE PROVIDED WITH SUCH A MODULE

[75] Inventors: Adrianus J. S. M. De Vaan, Eindhoven; Antonie W. Damen, Tilburg, both of Netherlands

[73] Assignee: U.S. Philips Corporation, New York, N.Y.

[21] Appl. No.: 08/976,517

[22] Filed: Nov. 21, 1997

[30] Foreign Application Priority Data

Nov. 25, 1996 [EP] European Pat. Off. ............ 96203308

[51] Int. Cl.[7] .................................................. G03B 21/28
[52] U.S. Cl. .................................... 353/38; 353/99; 349/8
[58] Field of Search .................................. 353/31, 34, 37, 353/38, 98, 99; 349/8, 9, 5, 113, 115

[56] References Cited

U.S. PATENT DOCUMENTS

| | | | |
|---|---|---|---|
| 5,029,986 | 7/1991 | De Vaan | 350/338 |
| 5,098,184 | 3/1992 | van den Brandt et al. | 353/102 |
| 5,161,042 | 11/1992 | Hamada | 359/41 |
| 5,430,562 | 7/1995 | Fushimi et al. | |
| 5,473,393 | 12/1995 | Manabe | 353/38 |
| 5,535,054 | 7/1996 | Shibuya | 359/487 |
| 5,749,642 | 5/1998 | Kimura et al. | 353/98 |
| 5,822,029 | 10/1998 | Davis et al. | 349/115 |
| 5,853,240 | 12/1998 | Tanaka et al. | 353/98 |
| 5,868,481 | 2/1999 | Conner et al. | 353/38 |

FOREIGN PATENT DOCUMENTS

0467447A1  1/1992  European Pat. Off. .

*Primary Examiner*—William Dowling
*Attorney, Agent, or Firm*—F. Brice Faller

[57] ABSTRACT

The invention relates to an image projection module (1) comprising, in this order, an illumination system (3) and an image display system (13) having at least one display panel (15) for modulating an illumination beam to be supplied by the illumination system (3) with image information. The illumination system (3) comprises an integrator system (19) having an exit surface which is located in an exit plane. First reflecting means (33; 43) are present in the exit plane of the integrator system (19) and the module (1) further comprises second, selectively reflecting means (39). An optical system (31) for at least partly imaging the exit surface via the second reflecting means on the first reflecting means is arranged between the first and the second reflecting means.

37 Claims, 9 Drawing Sheets

IMAGE PROJECTION MODULE AND IMAGE PROJECTION DEVICE PROVIDED WITH SUCH A MODULE

BACKGROUND OF THE INVENTION

The invention relates to an image projection module comprising, in this order, an illumination system including a radiation source and an image display system having at least one display panel for modulating an illumination beam to be supplied by the illumination system with image information, the illumination system comprising an integrator system having an exit surface which is situated in an exit plane.

The invention also relates to an image projection device provided with such an image projection module.

An image projection module of the type described in the opening paragraph is known from, inter alia, U.S. Pat. No. 5,098,184. The image projection module described in this Patent comprises an illumination system for supplying an illumination beam and an image display system having at least one display panel for modulating this light beam in conformity with image information to be protected. In addition to a radiation source, a reflector behind the radiation source and a condenser lens, the known illumination system also comprises an integrator system. A further lens ensuring that all re-images are superimposed in the plane of the display panel is arranged behind the integrator system.

The display panel may be, for example, a liquid crystalline display panel. Such a panel comprises two optically transparent plates enclosing a layer of liquid crystalline material and provided with a two-dimensional array of pixels. Each pixel comprises an active picture element which shuts off the relevant pixel from the exterior when it is not addressed. The active picture elements acquire their signals via row and column electrodes which also form part of the pixels. Moreover, there are small areas within the pixels which cannot be driven, which is due to photolithographic limitations. The pixel portions which are occupied by the row and column electrodes and the areas which cannot be driven will hereinafter be referred to as passive portions. The ratio between the active portion, which actually switches, and the passive portion defines the geometrical aperture of the display panel.

However, a liquid crystal display panel as described above causes a number of drawbacks as regards the light output of the image projection module.

In current LCD projection systems, the aim is, inter alia, miniaturization. However, if the display panels are reduced in size, while maintaining the resolution, the geometrical aperture will decrease so that considerable light losses may occur and the light output of the system will decrease. A known solution to this end is the use of a microlens array at the illumination side of the display panel, ensuring that the incident light is concentrated on the active pixel portions. In the case of miniaturization, the microlens arrays should also be reduced, as well as the distance between the microlenses and the liquid crystalline layer. These requirements relatively complicate their manufacture.

Moreover, the liquid crystalline display panel is generally situated between two polarizers if the display panel adds image information to the light beam by means of polarization modulation. If unpolarized light is incident on the display panel, substantially half of it will be absorbed by the first polarizer, which gives rise to heating of the polarizer and the display panel so that the display panel may be damaged. A known solution is to prepolarize the light in the light path between the radiation source and the display panel. However, this requires an extra component such as, for example, a polarizing beam splitter.

Moreover, if a color image projection device with a single display panel is concerned, approximately ⅔ of the light incident on the display panel will be lost. In fact, a color display panel creates a colored dot consisting of three separate pixels which cannot be distinguished with the naked eye. Within a set of three pixels, each pixel comprises a different color filter for absorbing two of the three primary colors which, in their turn, will be passed by one of the two other color filters. Each pixel thus passes only ⅓ of the incident light. In known image projection devices, this phenomenon is solved, for example, by splitting up the light beam of the radiation source into three monochrome sub-beams such as, for example, angular color separation, as described in U.S. Pat. No. 5,161,042.

In short, since light is incident on the passive portions of the display panel and since light having the unwanted direction of polarization and/or the unwanted wavelength is incident on the active portions, a considerable quantity of the light supplied by the radiation source is lost which thus cannot contribute to the formation of the image. To prevent this, a number of possibilities were presented in the past. A drawback is, however, the complexity of the image projection device realized in these manners. With further miniaturization, this complexity even increases, because the requirements for positioning and manufacturing the different components thereby become more stringent.

SUMMARY OF THE INVENTION

It is an object of the invention to provide a relatively simple image projection module in which light rays having a position of incidence, wavelength or polarization direction which is unwanted for the display panel can be recuperated and subsequently be given another opportunity of contributing as yet to the formation of the image. In this way, an image projection module having a relatively large light output is realized without extra efforts to be made for the radiation source.

To this end, the image projection module according to the invention is characterized in that first reflecting means are present in the exit plane of the integrator system, in that second, selectively reflecting means are present in the module, and in that an optical system for at least partly imaging the exit surface of the integrator system via the second reflecting means on the first reflecting means is arranged between the first reflecting means and the second reflecting means.

The invention is based on the recognition that light-obstructing or light-absorbing areas in the light path are eliminated before the formation of the image and that reflecting areas are introduced which have a selective reflection determined by the position, the wavelength or the direction of polarization of the incident light. Light which is incident at an unwanted position and has the unwanted wavelength or direction of polarization will further be generally referred to as unwanted light.

The inventive idea described hereinbefore is realized by a combination of first and second reflecting means between which the unwanted light is reflected and at least partly converted into wanted light. The unwanted light is thus recuperated instead of being absorbed or obstructed, so that a relatively high light output is realized without complicating the image projection module.

The optical system ensures that the light from the second reflecting means at least partly reaches the first reflecting means, and vice versa.

The integrator system may be implemented in different manners.

A first embodiment of the image projection module according to the invention is characterized in that the integrator system comprises a first and a second lens plate, the lenses of the second lens plate jointly constituting the exit surface of the integrator system.

In this case, the plane of the second lens plate is situated in the exit plane of the integrator system. The exit surface of the integrator system is situated in the exit plane. The exit surface is understood to mean the surface of the second lens plate contributing to the integrator function, in other words, the surface occupied by the lenses of the second lens plate.

Each lens plate is provided with a matrix of lenses, each lens of the first lens plate imaging the radiation source on a lens of the second lens plate. Each lens of the second lens plate images the corresponding first lens on the display panel.

A further embodiment of the image projection module according to the invention is characterized in that the first reflecting means comprise reflecting areas which are present on the second lens plate.

In this case, the second lens plate comprises both lenses and reflecting areas. There are different possibilities for the configuration of the lenses and the reflecting areas. The manner in which the reflecting areas are implemented is determined by the parameter at which the second reflecting means select unwanted light.

Another embodiment of the image projection module according to the invention is characterized in that the first reflecting means have at least one reflecting element adjoining the second lens plate and being situated in the exit plane of the integrator system.

In this case, at least one separate reflecting element is arranged in the plane of the first reflecting means. Here again, the implementation of the reflecting element is determined by the parameter at which the second reflecting means select unwanted light.

Another embodiment of the image projection module according to the invention, in which the integrator system is implemented in a different manner, is characterized in that the integrator system comprises an optically transparent bar whose end face remote from the radiation source constitutes the exit surface of the integrator system.

Since reflection of the light enclosed within the bar occurs at the side walls of the bar, a homogeneous light distribution will be produced at the end face of the bar remote from the radiation source.

The end face of the bar remote from the radiation source may be considered to be the exit surface. The plane in which the exit surface is situated is the exit plane of the integrator system.

A further embodiment of the image projection module according to the invention is characterized in that the first reflecting means have at least one reflecting element adjoining the end face of the bar and being situated in the exit plane of the integrator system.

In this case, the first reflecting means are constituted by one or more separately reflecting elements arranged in the exit plane of the integrator system.

A further embodiment of the image projection module according to the invention is characterized in that the plane of the second reflecting means encloses an angle different from 90° with the optical axis, and in that the optical system comprises a first and a second lens, the image of the exit surface of the integrator system created by the first lens being situated in the focal plane of the second lens.

By tilting the plane of the second reflecting means, the image of the exit surface of the integrator system can be shifted across the exit plane. By means of the optical system, the reflected image geometrically has the same properties as the light incident through the exit surface itself.

A further embodiment of the image projection module according to the invention is characterized in that the second reflecting means have reflecting areas which are at least partly integrated with the display panel.

The first reflecting means are preferably situated at the location of a window image. A window image is to be understood to mean the cross-section of the illumination beam at the location of the display panel.

If the image projection device is a color image projection device with a single color display panel, a colored dot is created which consists of three separate pixels. Each of these pixels comprises a different color filter. When white light is incident on a color display panel, only one third per pixel of the light incident on this panel will be used for the formation of the image. In fact, two thirds of the light has an unsuitable color for the relevant pixel and will be absorbed. To prevent this, the image projection module according to the invention is characterized in that the second reflecting, means comprise a pattern of dichroic reflecting elements, which pattern corresponds to the pattern of the pixels of the display panel.

The present invention thus proposes to replace the conventional color filter pattern in a color image projection module with a single display panel by a dichroic mirror pattern. A dichroic mirror passing the light at the wavelength suitable for the pixel corresponds to each pixel and reflects the other light towards the exit plane where this light is again given an opportunity to reach a suitable pixel. In addition to selection for the position of incidence, wavelength selection also takes place in this case.

The dichroic reflecting elements may be or may not be integrated with the display panel.

It is to be noted that it is known per se, for example, from U.S. Pat. No. 5,029,986, to provide a display panel with a pattern of dichroic mirrors corresponding to the pixel pattern, in order to realize a higher light output.

A further embodiment of the image projection module according to the invention is characterized in that a microlens array is arranged at an illumination side of the display panel, the dichroic elements being situated in a focal plane of the microlens array.

The microlens array ensures that the light incident on the display panel is concentrated on the active pixel portions. The dichroic mirrors may be arranged in the focal plane of the microlens array.

Another embodiment of the image projection module according to the invention is characterized in that a microlens array is situated at an illumination side of the display panel, the dichroic elements being arranged on the microlens array.

A liquid crystalline display panel comprises a two-dimensional array of pixels. Each pixel has an active portion, which actually switches, and a passive portion which is constituted by the electrodes and the black mask. Normally, light which is incident on the passive portions does not contribute to the formation of the image and gives rise to heating of the display panel, which may be harmful for the liquid crystalline material. To prevent this, another embodiment of the image projection module according to the invention is characterized in that the second reflecting means have a plurality of reflecting areas which at least partly coincide with the passive pixel portions of the display panel.

By providing reflecting areas at the location of the passive portions of the display panel, the light incident on this panel is reflected towards the first reflecting means. Consequently, the light originally incident on the passive portions is given one or more second opportunities of reaching, at least partly, the active pixel portions. In this case, the selection of unwanted light takes place with reference to the position of incidence on the display panel.

A further embodiment of the image projection module according to the invention is characterized in that the exit plane of the integrator system is substantially parallel to the second reflecting means, and in that the reflecting portion in the exit plane of the integrator system covers a surface which is twice as large as the exit surface.

This provides the possibility of increasing the light output of the image projection module by a second reflection on the second reflecting means.

A further embodiment of the image projection module according to tile invention is characterized in that the exit plane of the integrator system is substantially parallel to the second reflecting means, and in that the reflecting portion in the exit plane of the integrator system covers a surface which is three times as large as the exit surface.

The number of reflections, and consequently the possibility of recuperation, is thereby increased.

A further embodiment of the image projection module according to the invention is characterized in that the second reflecting means comprise a reflective polarizer which is arranged between the illumination system and the display panel, and in that polarization-converting means are present on or proximate to the first reflecting means.

When a light beam arrives at the reflective polarizer before it reaches the display panel, the direction of polarization which is unwanted for the display panel will be reflected again to the first reflecting means. The polarization-converting means ensure that the direction of polarization of this light is converted, so that, after reflection on the first reflecting means, this light will be given another opportunity of reaching the display panel so that it will as yet contribute to the formation of the image.

The second reflecting means may also consist of a combination of a reflective polarizer and reflecting areas on or proximate to the display panel. In that case, both the direction of polarization and the position or color of incident light on the display panel are selected.

A further embodiment of the image projection module according to the invention is characterized in that the polarizer is a linear retro-directive polarizer.

In this case, the unpolarized light emitted by the light source is linearly polarized on the polarizer, and the unwanted direction of polarization is sent back towards where it came from.

Another embodiment of the image projection module according to the invention is characterized in that the polarizer is a cholesteric polarizer.

In this case, the unpolarized light emitted by the light source is circularly polarized on the polarizer.

A cholesteric polarizer is an element which is known per se. Such a polarizer has an optical layer of a liquid crystal-line polymer material having a cholesteric ordering. This means that the molecules of the material spontaneously order in solution to a helical or helix-like structure with a pitch p. After providing such a solution as a thin, active layer between two parallel substrates, the helix-like structure is directed in such a way that the axis of the helix is transverse to the layer.

When an unpolarized beam is incident on a cholesteric polarizer, the laevorotatory and the dextrorotatary circularly polarized beam components will be separated from each other. In fact, a beam component having the direction of rotation which corresponds to the direction of the helix will be reflected, whereas the beam component having the other direction of rotation will be transmitted. However, the fact that the bean component is transmitted or not transmitted is not only determined by the direction of rotation but also by the wavelength of the incident beam. The reflection wavelength $\lambda_o = \frac{1}{2}(n_o + n_e) p$. Only the part of the beam component having the direction of rotation corresponding to the direction of the pitch and being situated within the wavelength band $\lambda_o$ will be reflected.

Another embodiment of the image projection module according to tile invention is characterized in that the polarizer is a polarizing beam splitter.

Such a polarizer is particularly advantageous if the display panel is a reflective display panel, because the polarization separation is to be accompanied by a separation of the directions of propagation in this case.

A further embodiment of the image projection module according to the invention, in which the second reflecting means are only constituted by the linear polarizer, is characterized in that the first reflecting means are specularly reflecting and in that $\lambda/4$ plate is present on or proximate to the first reflecting means.

In order to enable the light reflected by the reflective polarizer to be passed by the polarizer in the case of a second opportunity, the direction of polarization which is unwanted for the image display panel should be converted into the wanted direction of polarization at or proximate to the first reflecting means. This may be realized, for example, by implementing the first reflecting means as specular means and by providing a $\lambda/4$ plate on or proximate to these first reflecting means. The linearly polarized light is then first converted by the $\lambda/4$ plate into circularly polarized light. The direction of polarization thereof is inverted on the specular reflector. When this circularly polarized beam passes the $\lambda/4$ plate again, it will be converted into a linearly polarized beam having the direction of polarization which is complementary to the original beam.

Another embodiment of the image projection module according to the invention, in which the second reflecting means comprise the linear polarizer and have reflecting areas on or proximate to the display panel, is characterized in that a $\lambda/4$ plate is present in the light path of the light reflected on the linear polarizer, and in that the first reflecting means are specularly reflecting at least at positions where light reflected by the linear polarization is incident.

Since the light which is reflected by the polarizer must change its direction of polarization, the direction of polarization should be converted at positions where this light arrives. This can be realized by implementing the first reflecting means as specularly reflecting means at the positions where the light reflected from the polarizer arrives, and by providing a $\lambda/4$ plate in the light path of this light.

The reflected light coming from the display panel had the wrong position or the wrong color and should consequently not change its direction of polarization. Consequently, the positions where this light arrives should maintain their polarization. For linearly polarized light, for example, a specular reflector maintains its polarization.

Another embodiment of the image projection module according to the invention, in which the second reflecting means are constituted by the cholesteric polarizer only, is characterized in that the first reflecting means are specular.

When the beam component reflected by the cholesteric polarizer arrives at the first reflecting means again, its direction of polarization will be inverted, provided that the first reflecting means reflect specularly. Subsequently, the beam component coming from the first reflecting means will have the suitable direction of polarization so as to be passed towards the display panel by the cholesteric polarizer.

Another embodiment of the image projection module according to the invention, in which the second reflecting means comprise a cholesteric polarizer and have reflecting areas on or proximate to the display panel, is characterized in that a $\lambda/4$ plate on or proximate to the first reflecting means is present in the light path of the light reflected on the reflecting areas.

In this way, both the direction of polarization and the position of incidence on the display panel are selected. In this case, a $\lambda/4$ layer should be present at the positions which correspond to positions where the light reflected by the display panel reaches the first reflecting means. The positions on the specular reflector where the light reflected by the polarizer arrives should remain untreated, because the direction of polarization of this light must be inverted.

Another embodiment of the image projection module according to the invention, in which the second reflecting means comprise a cholesteric polarizer and have reflecting areas on or proximate to the display panel, is characterized in that cholesteric elements having a direction of rotation opposite to that of the cholesteric polarizer and situated on or proximate to the first reflecting means are present in the light path of the light reflected on the reflecting areas.

Instead of providing $\lambda/4$ plates at the positions where the direction of polarization of the incident light must be maintained, cholesteric elements may be provided, whose direction of rotation is opposite to that of the cholesteric polarizer which forms part of the second reflecting means. The light reflected by the display panel will be passed by tile cholesteric polarizer towards the first reflecting means where it will be reflected by the cholesteric elements while maintaining its direction of polarization and on condition that these elements have the opposite direction of rotation.

A further embodiment of the image projection module according to the invention, in which the second reflecting means have reflecting areas on or proximate to the display panel, is characterized in that both the plane of the reflective polarizer, on the one hand, and the plane of the reflecting areas and the display panel, on the other hand, enclose an angle different from 90° with the optical axis and also mutually enclose an angle.

In this way it can be ensured that the reflected light reaches such positions that the second-opportunity possibilities are optimal.

A further embodiment of the image projection module according to the invention is characterized in that the cholesteric polarizer comprises a single layer of a liquid crystalline polymer material, within which layer the pitch of the molecular helix varies between two values which correspond to the lower limit and the tipper limit, respectively, of the reflection band required to cover at least the full visible wavelength range.

This provides the possibility of polarization separation throughout the visible wavelength range. This is particularly advantageous in a color image projection device having a single display panel. A cholesteric polarizer consisting of a single layer has the advantage that a relatively high optical quality can be achieved and that it may be relatively thin in spite of the large wavelength range. Moreover, the fact that the reflection wavelength band shifts for non-perpendicular angles of incidence on the polarizer can be taken into account in a simple manner.

A further embodiment of the image projection module according to the invention is characterized in that a $\lambda/4$ plate is present between the cholesteric polarizer and the display panel.

There are display panels which modulate circularly polarized light, and display panels which modulate linearly polarized light. Since a cholesteric polarizer is a circular polarizer, a $\lambda/4$ plate is to be arranged between the polarizer and the display panel, if a linear display panel is concerned, so as to convert the desired circularly polarized beam component into a linearly polarized beam component.

A further embodiment of the image projection module according to the invention, in which the integrator system comprises a first and a second lens plate, is characterized in that the second lens plate is semi-circular or quarter-circular, the illumination system being adapted to supply a semi-circular or quarter-circular illumination beam, respectively, at the location of the second lens plate.

The pupil of the projection lens can be optimally filled with light in this way.

A further embodiment of the image projection module according to the invention, in which the integrator system comprises a first and a second lens plate, is characterized in that the lenses of the first lens plate have an aspect ratio which corresponds to that of the display panel.

In this way, an efficient illumination of the display panel is realized.

Another embodiment of the image projection module according to the invention is characterized in that the image display system comprises two display panels, one of the display panels being suitable for modulating a monochrome light beam, and the other display panel being suitable for modulating at least two different monochrome light beams, the display panels being preceded by a dichroic filter having a transmission wavelength which corresponds to the wavelength of the light beam to be modulated by the relevant display panel, and each light path between the radiation source and the relevant display panel being implemented similarly as the light path between the radiation source and the display panel as described hereinbefore.

An advantage of an embodiment, in which one display panel is used for two colors and the other display panel is used for the third color, is that a high resolution can be obtained for the color of the monochrome display panel. Another advantage is that the spectral efficiency of the lamp can be optimized. The two colors which jointly occur in the one display panel may of course be any combination of two primary colors.

Yet another embodiment of the image projection module according to the invention is characterized in that the image display system comprises two color display panels, in which each light path between the radiation source and the relevant color display panel is implemented similarly as the light path between the radiation source and the display panel as described hereinbefore.

Such a combination is used, inter alia, in three-dimensional image projection devices.

Another embodiment of the image projection module according to the invention is characterized in that each color channel is implemented similarly as the light path between the radiation source and the display panel of the image projection module as described hereinbefore.

A further embodiment of the image projection module according to the invention is characterized in that the means for recombining the modulated monochrome sub-beams is constituted by a dichroic prism system comprising two dichroic mirrors which cross each other.

The quality, notably the planeness of the dichroic mirrors which are used for recombination, is very important. A color recombination system in accordance with said embodiment is particularly advantageous for use in miniaturized image projection systems, because such systems have a relatively high divergence, while the interface between the dichroic mirrors is substantially invisible due to this divergence. Moreover, the dichroic mirrors may be implemented in a very plane manner because they are situated on a relatively thick and polished substrate.

A further embodiment of the image projection module according to the invention is characterized in that the image display system is a reflective image display system.

The invention further relates to an image projection device comprising an illumination system and an image display system jointly constituting an image projection module, and further provided with a projection lens system, and is characterized in that the image projection module is implemented as described hereinbefore.

A further embodiment of the image projection device according to the invention is characterized in that a third lens for imaging the exit plane of the integrator system in the entrance pupil of the projection lens system is present between the second lens and the projection lens system.

This third lens ensures that the diameter of the projection lens can remain limited.

A further embodiment of the image projection device according to the invention is characterized in that the cholesteric polarizer is arranged between the second and the third lens.

The reason therefor is that the second reflecting means are always present on or proximate to the display panel, where the light beam is telecentric.

All of the said λ/4 plates are preferably achromatic, i.e., they are active in a wide wavelength range so that the invention can be used without any problems in color image projection devices.

These and other aspects of the invention are apparent from and will be elucidated with reference to the embodiments described hereinafter.

DETAILED DESCRIPTION OF THE PREFERRED EMBODIMENTS

Figure 1A:
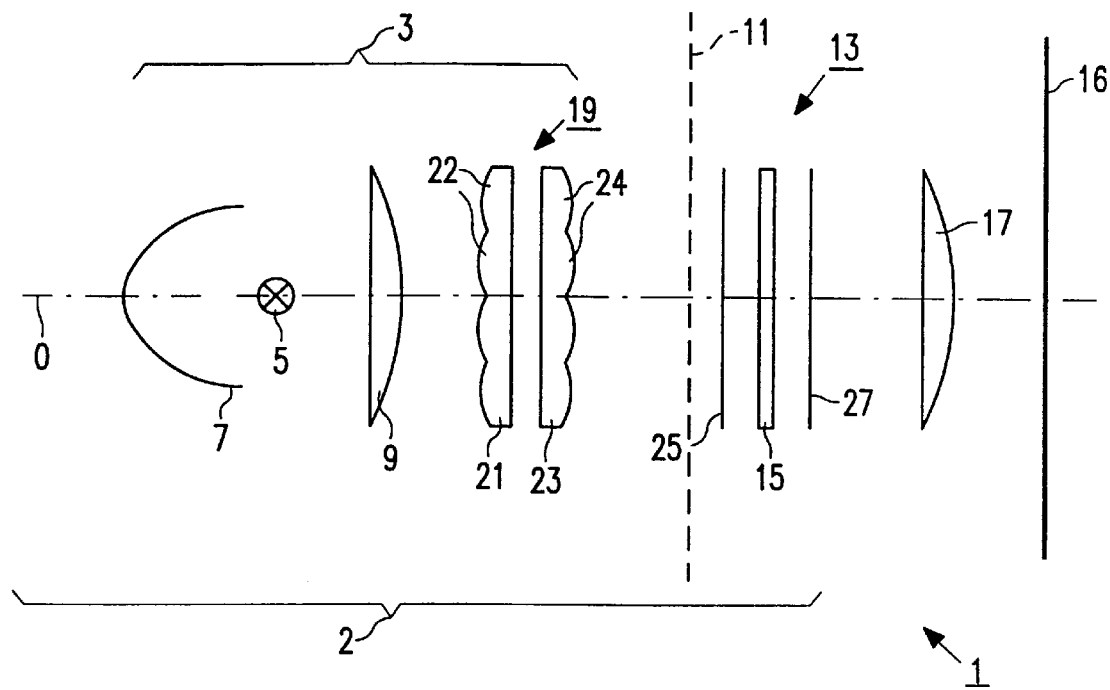
FIGS. 1(a) and 1(b) show embodiments of an image projection device including an integrator system.

The image projection device 1 shown diagrammatically in FIG. 1(a) comprises an illumination system 3 and an image display system 13 jointly constituting an image projection module 2. The illumination system 3 is provided with a radiation source 5 which is partly surrounded by, for example, a parabolic reflector 7 and is followed by a condenser lens 9. The radiation source may alternatively be partly surrounded by a spherical reflector. In that case, the condenser lens can be dispensed with. The illumination system 3 has an exit window 11. This is an imaginary plane perpendicular to the optical axis O of the image projection device 1, with respect to which the position of a number of elements will be determined. The exit window 11 is considered to be situated just in front of the display panel 15, viewed from the radiation source 5.

The image display system 13 comprises a display panel 15 which is enclosed between two polarizers 25 and 27. The image projection device 1 further comprises a projection lens system 17, shown by means of a single lens for the sake of simplicity, for projecting the modulated light on an image projection screen 16.

The illumination system 3 comprises an integrator system 19 in order to optimize the image homogeneity and the light output of the device. The integrator system 19 may comprise a first lens plate 21 and a second lens plate 23 as is shown in the embodiment of FIG. 1(a). Each lens plate 21, 23 comprises a number of lenses, denoted by 22, 24, arranged in the form of a matrix. The lenses of the first lens plate 21 have, for example, a uniform width and a uniform height which correspond to the aspect ratio of the display panel 15. Each lens 22 of the first lens plate 21 produces a lamp image in a corresponding lens 24 of the second lens plate 23. Each lens 24 of the second lens plate 23 images the corresponding lens 22 in the first lens plate 21 on the display panel 15, with all images on the display panel superposing each other.

Figure 1B:
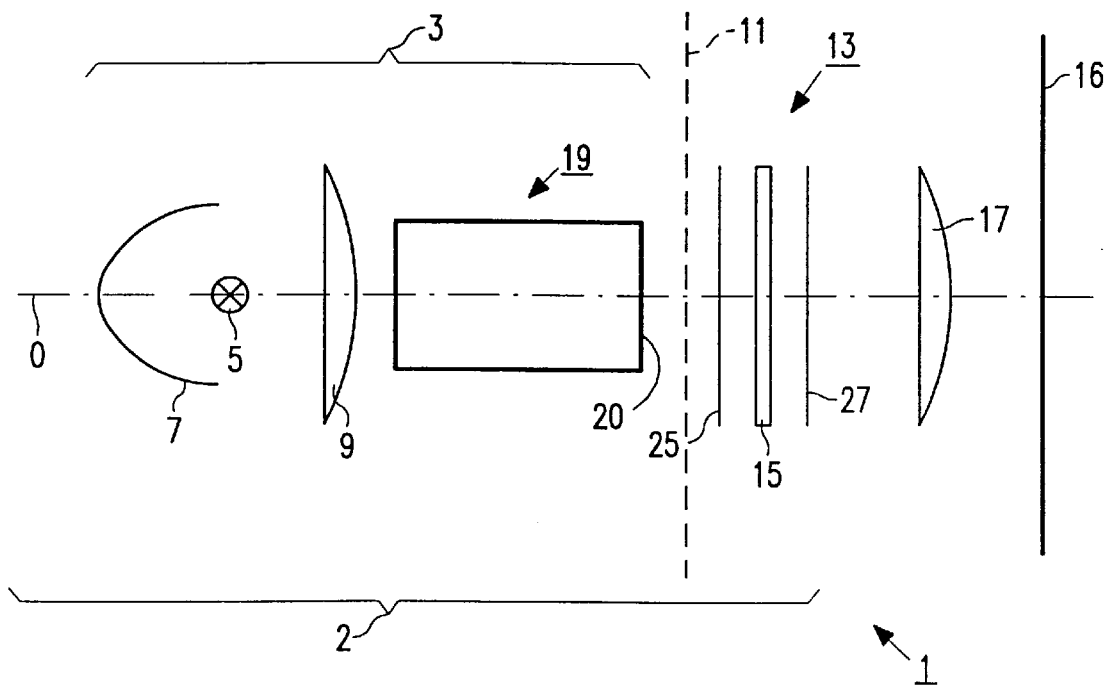

The integrator system 19 may alternatively be constituted by an optically transparent bar. The light coupled into the bar will be reflected several times on the side walls, so that a homogeneous distribution of light will be realized on the end face 20 of the bar remote from the radiation source 5. An image projection device with an optically transparent bar as an integrator is shown in FIG. 1(b).

The display panel may be, for example, a liquid crystalline display panel comprising a matrix of pixels. An active element, for example, a TFT (thin film transistor) decoupling the pixel from the exterior when it is not addressed is present in each pixel. The active elements receive their signals via row and column electrodes extending between the pixels. Moreover, due to photolithographic limitations, there are small areas within the pixels which cannot be driven. Consequently, a pixel may be considered to consist of an active portion, which actually switches, and a passive portion. The passive portion may cause a considerable loss of light if no extra measures are taken. In fact, the light coming from the radiation source and being incident on the passive pixel portions will not contribute to the formation of the image. Moreover, this light will cause unwanted heating of the display panel due to absorption. A known solution is to arrange a microlens array at the illumination side of the display panel, which array ensures that the light is concentrated on the active pixel portions. A drawback thereof is that the manufacture of such display panels will become extremely complex if they are miniaturized.

The display panel may be a monochrome panel. If a color image projection device is desired, for example, three color channels may be provided, one for each of the primary colors, and each color channel is then provided with a monochrome display panel. The light beam C coming from the radiation source is first split tip into three sub-beams which are recombined after modulation.

The display panel may alternatively be a color display panel. In this case, each colored dot is created by three different monochrome pixels which cannot be distinguished with the naked eye. These pixels are provided with a color filter which transmits the relevant color and absorbs the two other primary colors. In this way, however, two thirds of the white light incident from the radiation source is lost due to absorption.

If the operation of the display panel is based on polarization modulation, the display panel is situated between a first polarizer 25 for creating polarized light and a second polarizer 27, referred to as the analyzer, for rendering the polarization-modulated light visible as luminance variations. Substantially 50% of the light coining from the radiation source 5 is lost created by the first polarizer 25. A known solution is to implement the first polarizer as a reflective polarizer and combine it with a polarization-converting element so that the direction of polarization which is unwanted for the display panel is as yet converted into the wanted direction of polarization. To prevent heating of the analyzer, a refractive analyzer may be chosen. This is an analyzer which refracts the light from the light path instead of absorbing the light which is unwanted for the formation of the image.

If the display panel is, for example, a diffuse liquid crystalline display panel, for example, a PDLC, the polarizer may be dispensed with.

All of these known measures for reducing the loss of light as much as possible render an image projection module very complex. Notably when further miniaturization of the display panels is desirable, the requirements imposed on the optical components in the system become ever more stringent.

The present invention proposes some measures by which the loss of light in the image projection module is reduced considerably without a greater complexity of the module, even if the display panels are further miniaturized.

FIGS. 2, 5(a), 5(b), 5(c), 7, 8, 9, 10 and 11 show some embodiments of an image projection device according to the invention and will be described hereinafter.

One of the measures proposed in the present invention is to provide first reflecting means in the exit plane of the integrator system 19 and second reflecting means in or proximate to the exit window 11 of the illumination system 3, the exit surface of the integrator system 19 being imaged in the exit plane 29 via the second reflecting means with the aid of an optical system 31 which is situated between the first and the second reflecting means. The exit plane 29 is the plane in which the second lens plate 23 is situated if the integrator system comprises two lens plates. The exit plane 29 is the plane in which the end face 20 is situated if the integrator system consists of an optically transparent bar. In the manner described, it is possible to recuperate light coming from the radiation source 5 and being incident on an unwanted position on the display panel 15 or having the unwanted optical property of being modulated such as, for example, an unwanted direction of polarization or an unwanted wavelength, and to give it a second opportunity of being as yet incident on a different position or with a different direction of polarization on the display panel 15 so that it can contribute to the formation of the image. The image projection module according to the invention is adapted to be such that the reflected light, in other words, the unwanted light, makes a new image of the exit surface of the integrator system at the area of the exit plane 29 in which the second lens plate 23 or the end face 20 are positioned. By placing the first reflecting means at the location of this image, the light can be reflected to the display panel 15 again and given another opportunity of being modulated.

There are various possible embodiments of the first and the second reflecting means. The embodiment for each of the reflecting means and their combination is dependent on the selection parameter for recuperating the light.

The first reflecting means may be constituted by a separate element which is situated in the exit plane of the integrator system 19. This embodiment is possible for both embodiments of the integrator system. The first reflecting means may also be integrated in the second lens plate 23. This embodiment is only possible if an integrator system with lens plates is concerned.

The plane of the second reflecting means is tilted with respect to the optical axis so that the image of the exit surface of the integrator system is shifted across the exit plane.

Figure 2:
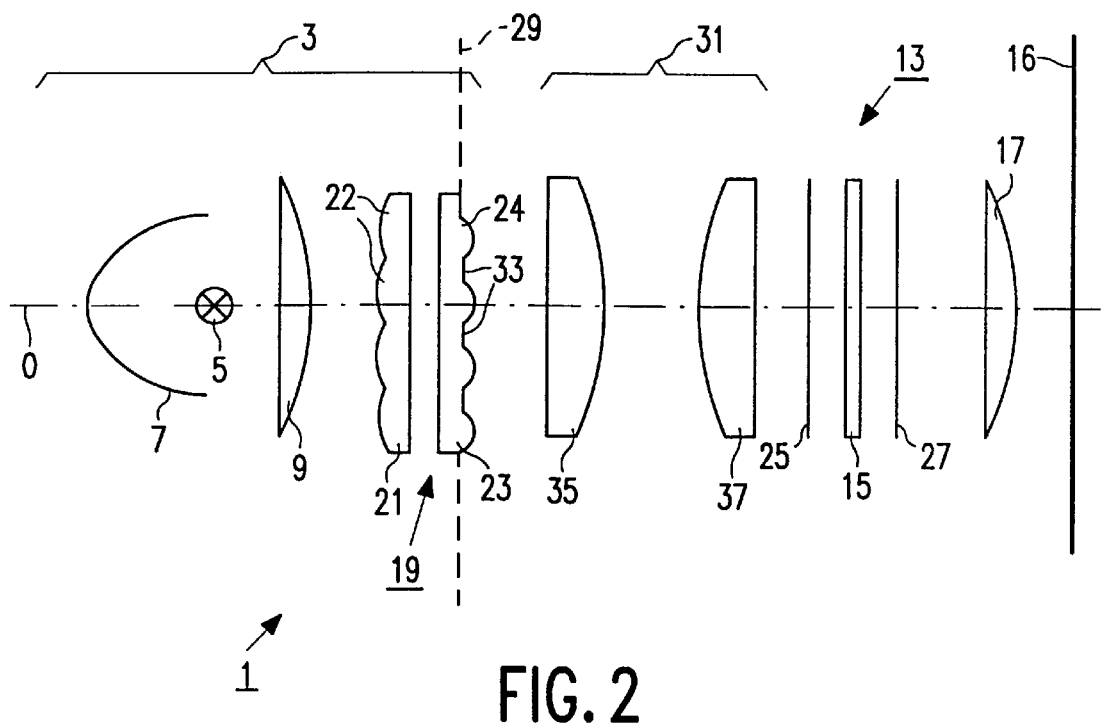
FIGS. 2, 5(a), 5(b), 7 and 8 show some embodiments of an image projection module according to the invention.
Figure 3:
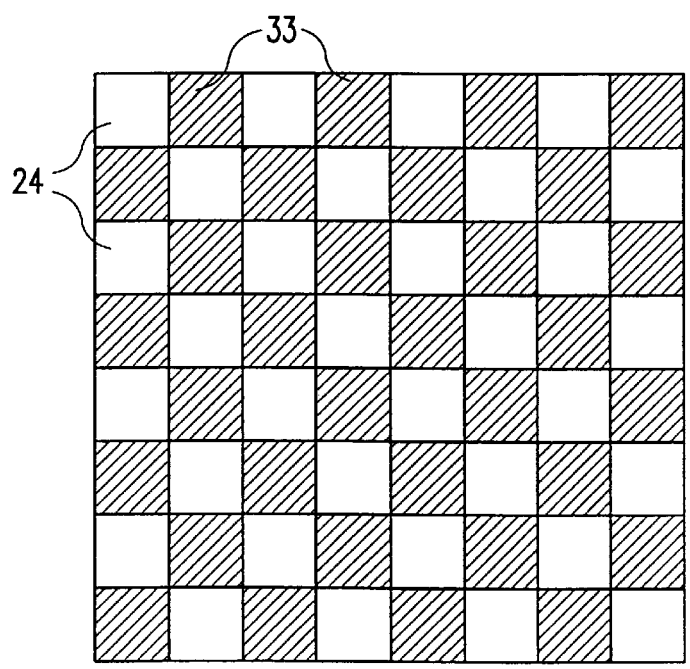
FIG. 3(a) shows the distribution of lens elements and reflecting areas on the surface of the lens plate for a single reflection on the second reflecting means.

FIG. 2 shows an embodiment of an image projection device with an image projection module in which the first reflecting means are integrated with the lens plate 23 and constituted by reflecting areas 33 which are distributed on the surface of this lens plate. Each lens 24 of the second lens plate 23 emits the same light cone with an aspect ratio corresponding to that of the display panel 15. The optical system 31 which is situated between the integrator system 19 and the display panel 15 comprises a first lens 35 and a second lens 37. A window image of each lens 24 from the second lens plate 23 is produced in the focal plane of the first lens 35, all of which window images coincide. A window image is understood to mean the cross-section of the illumination beam at the area of the display panel 15. By changing the focal length of the lens 35, the size of the window image can be adapted. The second lens 37 is chosen to be such that it images the second lens plate 23 at infinity, with the image of the second lens plate 23 made by the first lens 35 being located in the focal plane of the second lens 37. Due to this choice of the first lens 35 and the second lens 37, the image of the second lens plate 23 reaches the original plane 29 again after reflection on the reflecting areas 33 without having changed its dimension. The second lens plate 23 comprises, for example, as many reflecting elements 33 as lens elements 24 and, moreover, the reflecting elements 33 and the lens elements 24 are equal in size. FIG. 3 shows the distribution of the lens elements 24 and the reflecting elements 33 oil the surface of the second lens plate 23.

Since the plane of the second reflecting means is tilted with respect to the optical axis, each lens of the second lens plate can be imaged on a reflecting element positioned between the lenses. After reflection on these elements in the second lens plate, the light cones coming from these elements will illuminate the display panel in a similar manner as those coining from the lenses of the second lens plate, because the light cones from the reflecting elements and those from the lenses of the second lens plate are geometrically identical. In this way, the light output of the image projection module can be increased considerably. In this configuration, a light ray which is reflected on the second reflecting means for the second time will reach the lens in the second lens plate 23, where the light ray originally came from. Consequently, due to the second reflections, no extra contribution to the light output of the system is given in this embodiment.

The embodiment described hereinbefore has the same effect as the use of a microlens array, namely, the loss of light occurring because light is also incident on the passive portions is reduced considerably, though with the advantage that its operation is independent of the thickness of the substrates of the display panel and is consequently not influenced upon miniaturization of the display panel and for display panels having a reduced geometrical aperture such as, for example, display panels having the same dimensions but a higher resolution.

Another embodiment of the first reflecting means consists of providing a separate reflecting element in the exit plane 29 of the integrator system 19, next to and/or above the exit surface of the integrator system. In this case, the first reflecting means are not integrated with the second lens plate. This embodiment may be used for both possibilities of the integrator system and will be described extensively hereinafter.

Different embodiments are also possible for the second reflecting means. The second reflecting means may be situated in the exit window 11 of the illumination system 3 but may alternatively be situated in its proximity and then integrated with the display panel. A first manner, in which the means are integrated with the display panel, is to replace the absorption color filter pattern present on the known display panels by a dichroic mirror pattern, if a single color display panel is concerned. In this case, light which is incident on an unwanted position at a given wavelength is given another opportunity of being incident on a different position on the display panel. Instead of absorbing two primary colors per filter, these two colors will be reflected towards the exit plane 29 of the integrator system 19. After reflection on the first reflecting means, the light of these wavelengths will reach a different position on the display panel, provided that the first and the second reflecting means are positioned at a suitable angle with respect to each other. In this case, tilting of the second reflecting means involves tilting of the display panel.

The second reflecting means may also comprise reflecting areas on the display panel. As already described hereinbefore, the light which is incident on the passive pixel portions will not contribute to the formation of the image. By rendering these passive portions reflective, the light incident thereon will be reflected towards the first reflecting means and, upon a second opportunity, it will subsequently be incident on different positions, at least a number of which are active pixel portions.

Figure 4A:
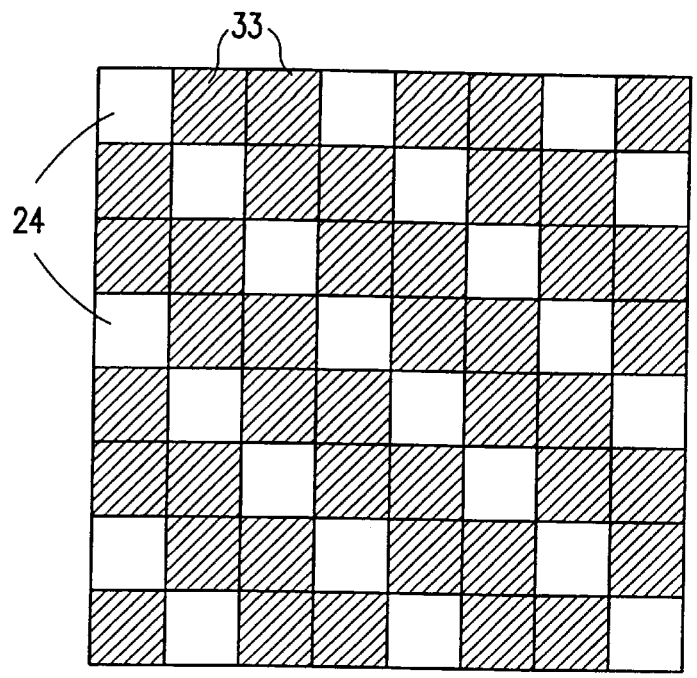
FIGS. 4(a) and 4(b) show possible distributions of lens elements and reflecting areas on the surface of the second lens plate for double reflection on the second reflecting means.
Figure 4B:
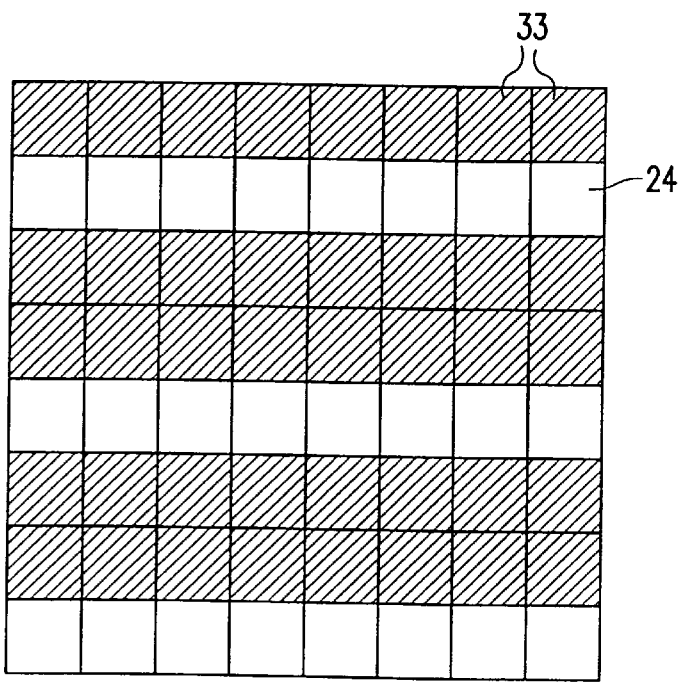

To obtain an even higher light output, the exit plane 29 of the integrator system 19 is tilted through the same angle with respect to the optical axis as the second reflecting means. If the integrator system comprises two lens plates, the second lens plate is tilted. If the integrator system comprises an optically transparent bar, the end face 20 may be ground at a given angle. In this way, second reflections on the display panel are realized so that the light is again directed onto the pattern of reflecting elements on the exit surface of the integrator system and consequently contributes to the light output of the system. The reflective surface in the exit plane 29 should be twice as large as the exit surface. If the reflecting areas are integrated with the second lens plate, the reflecting surface of the second lens plate 23 is twice as large as the lens surface. FIGS. 4(a) and 4(b) each show a possible distribution of the lens elements 24 and the reflecting areas 33 on the surface of the lens plate 23.

Figure 5A:
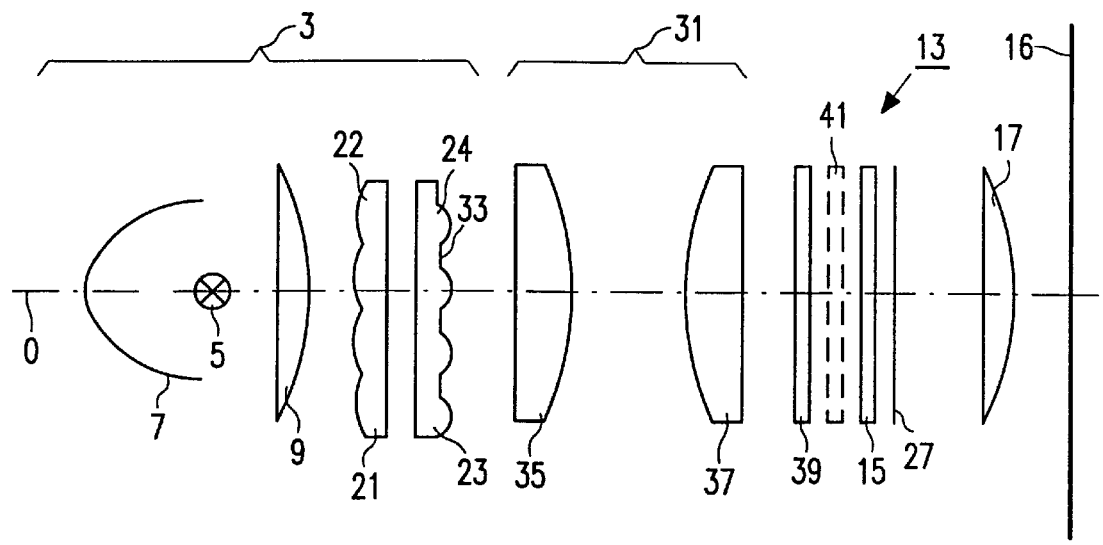

The second reflecting means may also comprise a reflective polarizer 39, as is shown in FIG. 5(a). There are different versions of the reflecting polarizer. The reflecting polarizer 39 may be a linear retro-directive polarizer. When an unpolarized beam is incident on such a polarizer, half of this beam will be passed. The other direction of polarization will be reflected towards the point where the beam came from. In order that the reflected beam is given a second opportunity and can as yet contribute to the formation of the image, polarization-converting means are to be situated on or proximate to the first reflecting means. To this end, the first reflecting means may be implemented as a specular reflector, with a $\lambda/4$ plate being present in the light path between the polarizer and the first reflecting means. The $\lambda/4$ plate may be situated on or proximate to the first reflecting means. Consequently, the direction of polarization will be converted into the complementary direction of polarization and will subsequently be passed towards the display panel 15 upon arrival at the polarizer 39.

The reflective polarizer 39 may also be a cholesteric polarizer. A cholesteric polarizer comprises a liquid crystalline material with a cholesteric ordering and is a circular polarizer which reflects the direction of polarization whose direction of rotation corresponds to the direction of rotation of the molecular helix of the cholesteric material. The reflected direction of polarization should be the direction of polarization which is unwanted for the display panel and is reflected towards the first reflecting means. In combination therewith, the first reflecting means should be implemented as a specular reflector, because a specular reflector converts circularly polarized light into circularly polarized light having the opposite direction of rotation. Upon arrival at the cholesteric polarizer, this direction of rotation will be passed. In this case, the second reflecting means are present between the illumination system and the display panel, possibly in the exit window 11 of the illumination system 3. If the display panel works with linearly polarized light, a $\lambda/4$ plate 41 is preferably present between the cholesteric polarizer and the display panel so as to convert the circularly polarized radiation from the cholesteric polarizer into linearly polarized radiation. The $\lambda/4$ plate 41 is shown in a broken line, because it is an optional element. The unpolarized light which is passed via the exit surface of the integrator system, for example through the lenses 24 of the second lens plate 23, to the display panel 15, is circularly polarized by the cholesteric polarizer 39. The direction of polarization which is unwanted for the display panel 15 is reflected towards the exit plane 29 via the first lens 35 and the second lens 37 and imaged on the pattern of reflecting areas 33 on the second lens plate 23. Upon reflection on these elements 33, the direction of rotation of the circularly polarized light will be inverted, provided that these elements are implemented as specular reflectors. Light is again incident on the cholesteric polarizer 39 via the first and the second lens 35, 37 and will now have the suitable direction of rotation to be passed to the display panel 15.

If the second reflecting means comprise a cholesteric polarizer, the first polarizer 25 preceding the display panel may be dispensed with.

Figure 5B:
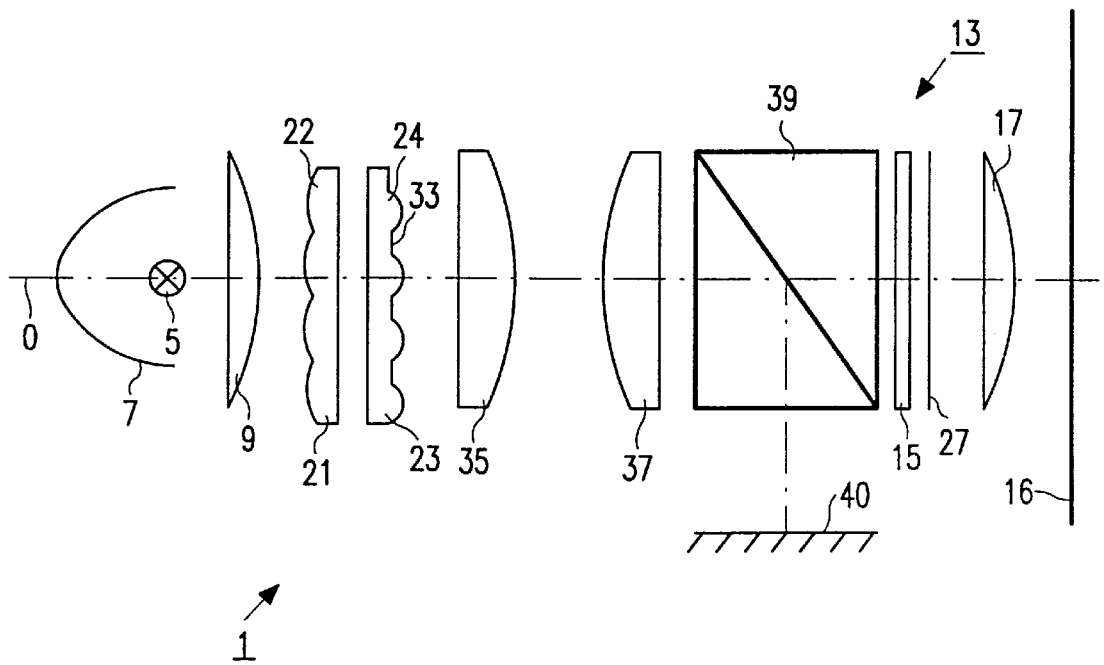

Yet another possibility is to implement the polarizer 39 as a beam splitter. An embodiment thereof is shown in FIG. 5(b). The unwanted direction of polarization is deflected from the light path by the beam splitter 39 and sent towards a reflector 40. Tile first reflecting means should be specular again and a λ/4 plate should be present in the light path between the polarizer 39 and the first reflecting means so as to convert the direction of polarization before the light reaches the beam splitter again. A beam splitter as a polarizer is particularly suitable in the case of reflective display panels, because in such a case, different polarisation directions are ultimately to have different propagation directions.

The second reflecting means may further comprise reflecting areas or dichroic mirrors on or proximate to the display panel 15. In this case, care should be taken that the light which is reflected by the reflecting areas upon reflection on the first reflecting means should maintain its direction of polarization, whereas the direction of polarization of the light reflected by the polarizer should be inverted so that it will subsequently be passed by the polarizer 39.

Figures 5C, 6A:
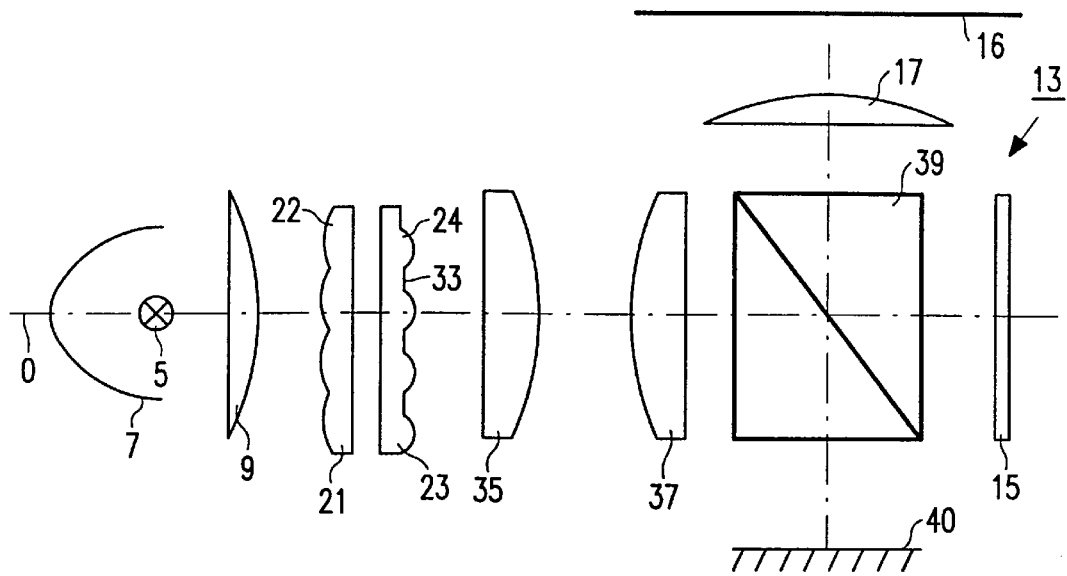
FIGS. 6(a) and 6(b) show the distribution of lens elements and reflecting areas on the surface of the second lens plate, and the distribution of the integrator surface and the reflecting surface on the exit surface of the integrator if the second reflecting means are constituted by the combination of a cholesteric polarizer and reflecting areas integrated with the display panel.
FIGS. 5(c) and 11 show embodiments of an image projection device including an image projection module according to the invention, with a reflective display panel.

If the integrator system comprises two lens plates, for example, three reflecting elements 33 are provided per lens 24 in the second lens plate 23, the size of a lens element being equal to the size of a reflecting element. This distribution on the lens plate 23 is illustrated in FIG. 6(a). The reflecting elements, denoted by M, are situated above the lenses 24. The lenses are imaged on these elements for the light reflected on the polarizer 39.

Figure 6B:
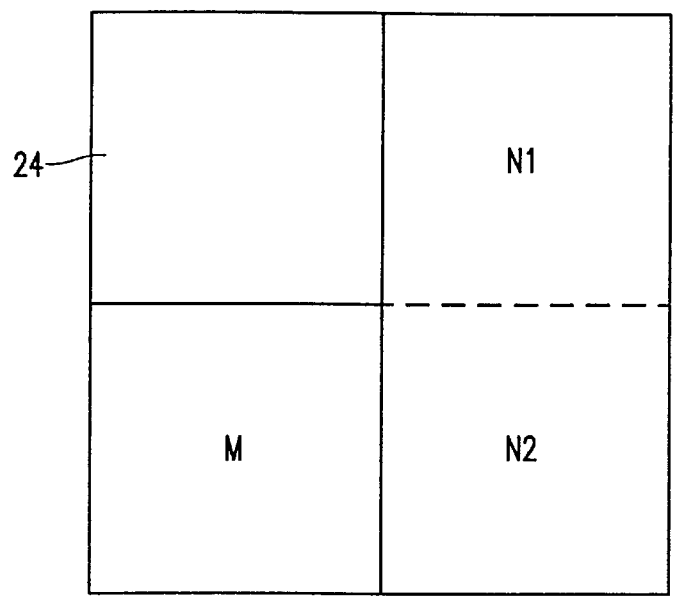

If the first reflecting means comprise a separate reflector which is arranged in the exit plane 29 of the integrator system 19, then there are three reflecting elements having a surface area which is substantially equal to the surface area of the exit surface. FIG. 6(b) shows an example of such a configuration. The exit surface, in other words, the part having the integrator function, is denoted by the reference numeral 24. The reflecting areas M, N1 and N2 have the same function as the reflecting elements M, N1 and N2 in FIG. 6(a) which will hereinafter be described in greater detail.

If the polarizer 39 is a cholesteric polarizer, the elements M will invert the circular direction of polarization of the light incident thereon, provided that they are implemented as specular reflectors. In fact, these elements receive light which is reflected by the polarizer. The reflecting elements N1 receive the light which is reflected for the first time by the reflecting areas of the display panel 15, because the light reaches an unwanted position on the display panel 15. These reflecting elements N1 are situated next to the lenses 24 and the elements M. Both the display panel 15 and the cholesteric polarizer 39 are tilted with respect to the optical axis, but in different directions. Since the elements N1 are tile elements receiving light reflected by the display panel, these elements are to be provided with a λ/4 layer in order that the direction of polarization is maintained upon reflection on these elements. The elements N2 should be implemented in the same way as the elements N1. In fact, the elements N2 receive the light which is reflected for the second time by the display panel.

Instead of providing the elements N1 and N2 with a λ/4 plate for maintaining the direction of polarization of the incident light, the elements N1 and N2 may alternatively be provided with a cholesteric polarizer having a direction of rotation which is opposite to that of the polarizer 39. The light first passes the polarizer 39 towards the display panel. Since the light is incident at an unwanted position on this panel, it is reflected by the display panel and passed by the polarizer 39 towards the first reflecting means again. If, at the positions where this light arrives, the first reflecting means has a cholesteric polarizer with a direction of rotation which is opposite to that of the polarizer 39, this light will be reflected there without changing its direction of polarization. Subsequently, it will be passed again by the polarizer 39 and at least partly reach suitable positions on the display panel.

In the combination of a linear reflective polarizer with reflecting areas on or proximate to the display panel, the areas N1 and N2 of the first reflecting means on which the light is incident and is reflected by the display panel should maintain the direction of polarization and thus reflect the linearly polarized light specularly. The areas M on which the light is incident and is reflected by the polarizer should convert the direction of polarization and consequently reflect specularly, and should further be provided with a λ/4 layer.

Also these embodiments provide the possibility of tilting the second lens plate 23 parallel to the second reflecting means in order to allow the second reflections on the image display panel to contribute to the light output of the system. The display panel 15 may also be provided with a microlens array (not shown). It is thereby achieved that the incident light is mainly concentrated on the active pixel portions of the display panel. A microlens array may be provided in two different modes. In a first mode, the dichroic mirrors are situated in the focal plane of the microlens array. The center of each mirror is situated on the optical axis of the corresponding microlens. The microlens array is parallel to the display panel. In a second mode, the dichroic mirrors are arranged on the flat side of tile microlens array.

Figure 7:
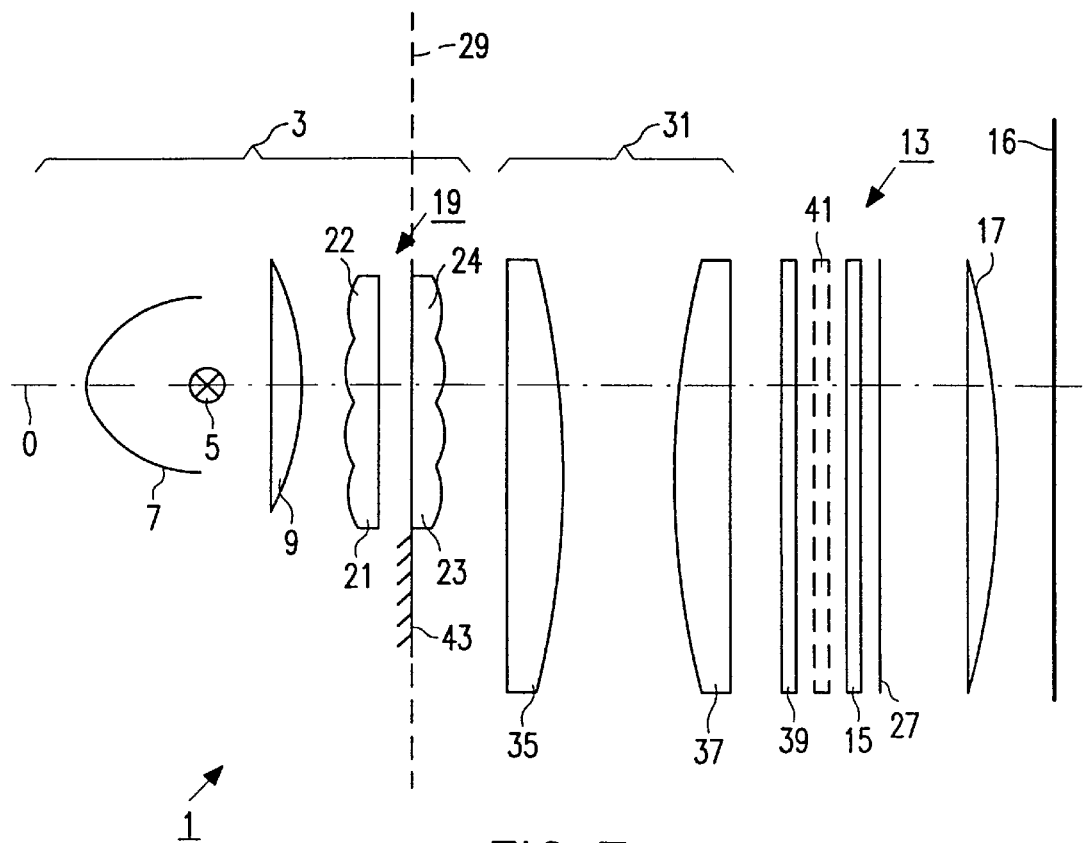

As already previously noted, the first reflecting means may alternatively be constituted by a reflecting element 43 which adjoins the second lens plate 23 and is situated in the same plane 29 below, above or next to the exit surface of the integrator system. FIG. 7 shows an embodiment of an image projection device with such all image projection module. The light reflected on the second reflecting means makes a new image of the exit surface, for example, the lens plate 23 or the end face 20, in the exit plane 29 of the integrator system 19, at the location whereof the reflecting element 43 is situated. This reflecting element 43 again sends the light to the display panel 15 where it is given a second opportunity of being modulated by the display panel 15. The reflecting element 43 is a separate element in this case.

If the second reflecting means are constituted by a cholesteric polarizer 39, as in FIG. 7, the cholesteric polarizer 39 is tilted with respect to the optical axis so that, in combination of the first and the second lens 35, 37, the light reflected on the cholesteric polarizer 39 reaches the reflecting element 43. In this case, the reflecting element 43 should be a specular reflector in order to enable it to invert the direction of rotation of the incident polarized light. The reflecting element 43 may be, for example, a metallic mirror. The light which is reflected by the reflecting element 43 to the display panel 15 will now be passed by the cholesteric polarizer 39. The reflected image of the second lens plate 23 or the end face 20 on the reflecting element 43 geometrically has the same properties and shape as the light incident through the integrator. In the exit plane 29, the reflected image of the exit surface of the integrator system with respect to the optical axis O is a point-symmetrically mirrored image of the light beam passed by the exit surface itself.

In a preferred embodiment of the image projection module comprising an integrator system with two lens plates, the illumination system is adapted in such a way that a beam having a semi-circular or quarter-circular cross-section is generated at the location of the second lens plate without loss of light occurring in the light beam supplied by the light source. In that case, the original and mirrored images jointly constitute a circular cross-section illuminating the display panel 15. The image reflected on the reflecting element 43 constitutes a window image via the first and the second lens 35, 37 at exactly the same location as the light passed by the integrator system 19. For special embodiments of the integrator system with two lens plates, reference is made to European Patent Specification EP 0 467 447.

Figure 12A:
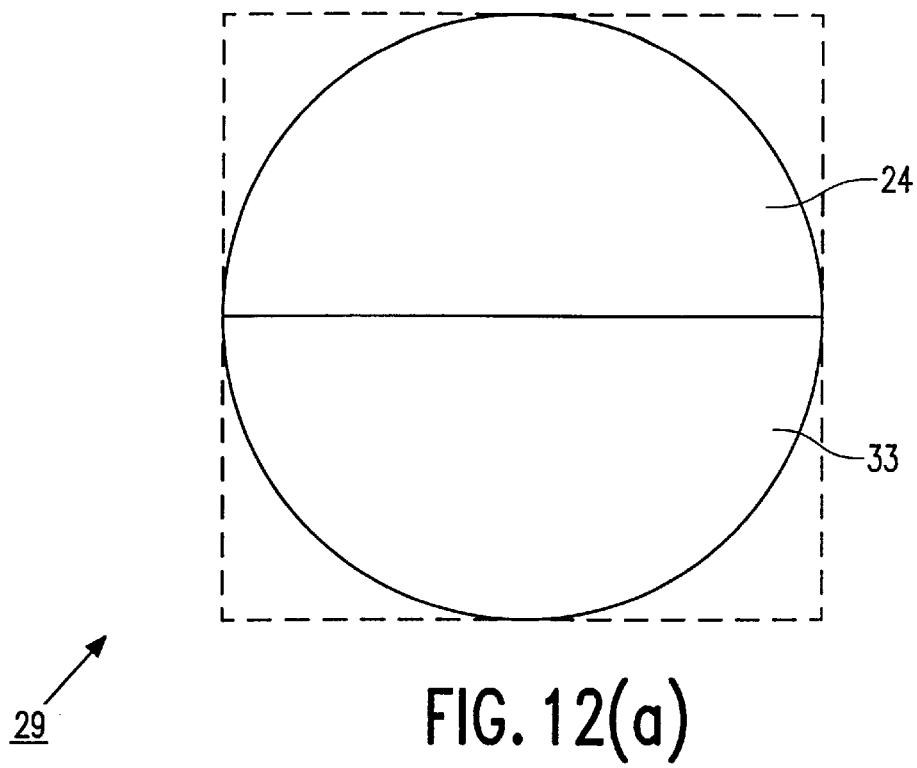
FIGS. 12(a) and 12(b) show the distribution of the integrator surface and the reflecting surface on the exit surface of the integrator system for a beam having a semi-circular and quarter-circular cross-section, respectively.
Figure 12B:
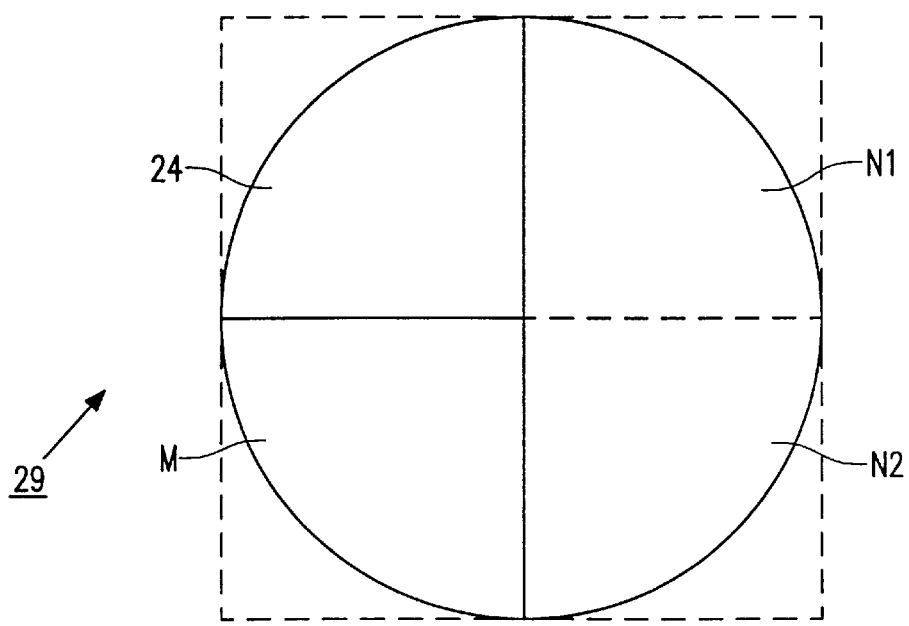

FIGS. 12(a) and 12(b) show possible configurations for the combination of the exit surface of the integrator system with separate reflecting elements for a semi-circular and quarter-circular cross-section, respectively, of the illumination beam. In this way, material can also be saved by adapting the shape of the exit plane 29 to the shape of the cross-section of the light beam.

If the display panel 15 works with linearly polarized light, a λ/4 plate 41 is situated between the cholesteric polarizer 39 and the display panel 15.

If the second reflecting means are integrated with the display panel 15, the light which is reflected on the display panel 15 is also imaged in the exit plane 29 next to, below or above the exit surface. If the reflecting element 43 is, for example, a metallic mirror and the second reflecting means is a cholesteric polarizer, then the mirror is to be provided, at the positions where the reflected light of the display panel arrives, with a λ/4 layer or with a cholesteric polarizer having a direction of rotation opposite to that of tile polarizer 39 so as to inhibit inversion of the direction of polarization on the reflecting element. The display panel 15 is tilted at such an angle with respect to the optical axis that the image of the second lens plate 23 reaches the reflecting element 43.

Figure 8:
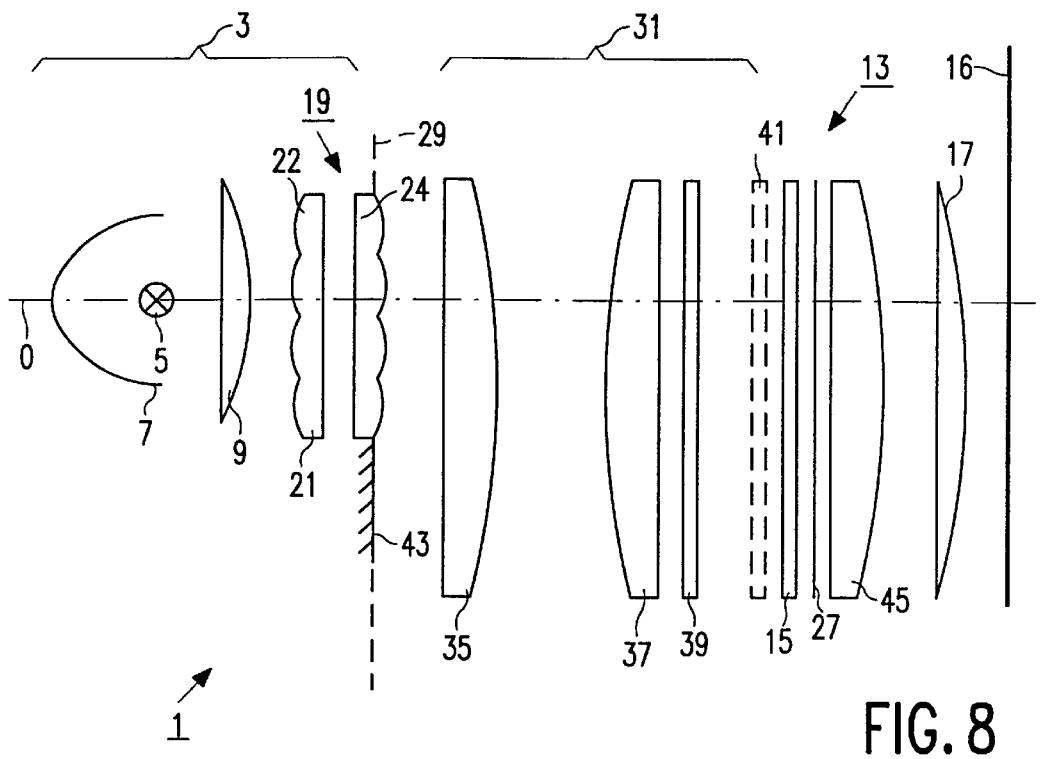

The image projection device may be further provided with a third lens 45 which makes an image in the pupil of the projection lens 17 of the light passed by tile integrator system 19 and of the reflected image. FIG. 8 shows an embodiment of an image projection device with an image projection module whose optical system comprises a third lens 45. The lens 45 may be situated either in front of or behind the display panel. In FIG. 8, the first reflecting means are constituted by a separate reflecting element. The third lens 45 may be arranged either in an image projection module, in which the first reflecting means are integrated with the second lens plate, or in an image projection module in which the first reflecting means are constituted by separate reflectors. If such a lens 45 is present, the cholesteric polarizer may be arranged between the second and third lens, provided that the integrator image for this position is at infinity.

Said λ/4 plates and λ/4 layers are preferably achromatic.

Figure 9:
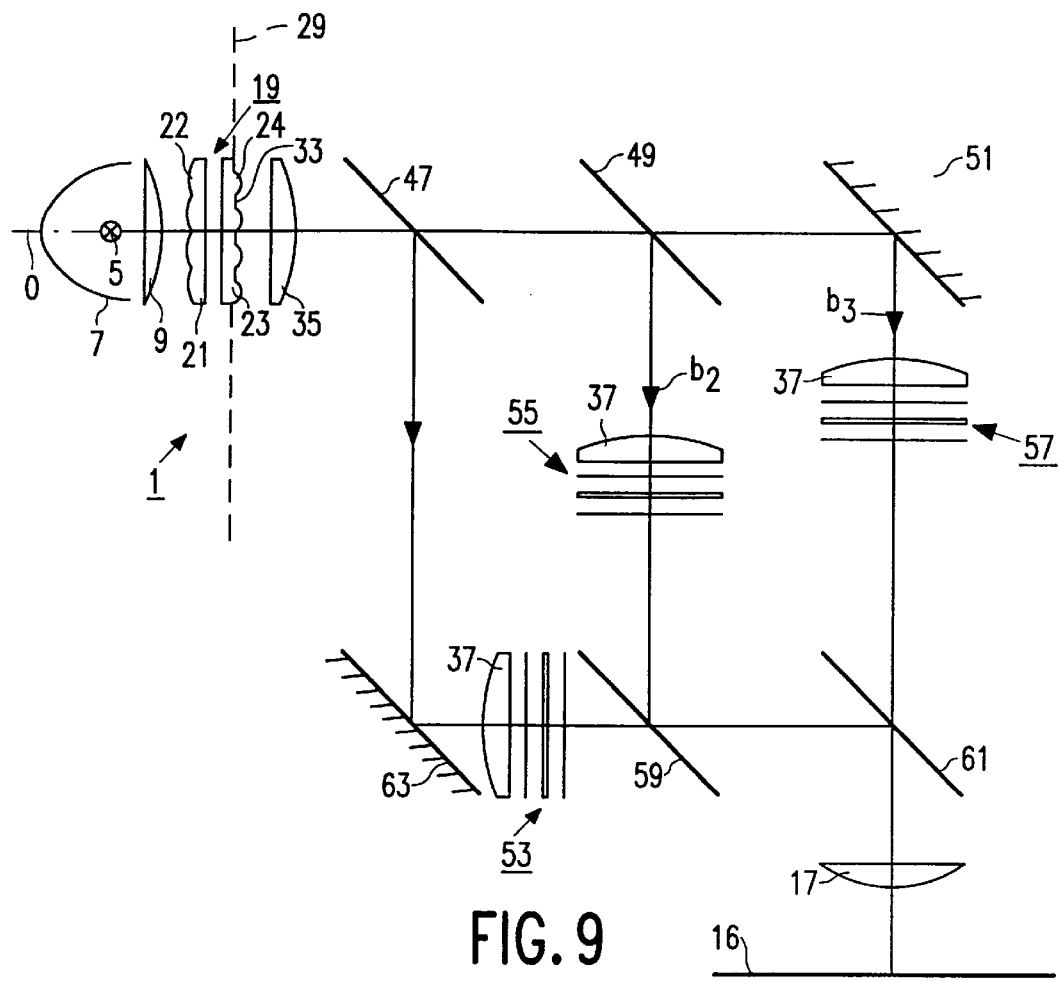

FIG. 9 shows an embodiment of a color image projection device with three monochrome display panels 53, 55, 57 instead of a single color display panel. The white light emitted by the radiation source 5 is split up into three sub-beams $b_1$, $b_2$, and $b_3$, one of each primary color, by means of, for example, two dichroic mirrors 47, 49. A monochrome display panel 53, 55, 57 corresponding to the relevant color for modulating the sub-beams with the image information is situated in each of these sub-beams. After modulation, the sub-beams are recombined by means of two dichroic mirrors 59, 61 to a single beam which is projected to form an image on an image projection screen 16 by means of a projection lens system represented, for the sake of simplicity, by a single projection lens 17. The mirrors denoted by the reference numerals 51 and 63 are ordinary folding mirrors. In this embodiment, the illumination system 3 comprises an integrator system 19 with a first lens plate 21 and a second lens plate 23. First reflecting means are situated in the plane 29 of the second lens plate 23.

The first reflecting means may be integrated with the lens plate 23 in the form of reflecting areas 33 which are present between the lenses, as is shown in FIG. 9. Each display panel is provided with such reflecting areas. The first reflecting means may alternatively be constituted by a separate reflecting element, analogous to those in FIGS. 7 and 8 and situated in the plane of the lens plate 23. The second reflecting means may comprise a cholesteric polarizer 39. Each color channel comprises a cholesteric polarizer in front of the display panel, viewed from the radiation source. The cholesteric polarizer may be considered to be a part of the illumination system. If the second reflecting means comprise a cholesteric polarizer, the first reflecting means should be implemented as a specular reflector. The second reflecting means may also comprise reflecting areas which at least partly coincide with the passive pixel portions of the display panels. An embodiment in which the second reflecting means comprise a dichroic mirror pattern is not applicable in this case, because the display panels are monochrome panels.

The second reflecting means may also be a combination, per color channel, of a reflective polarizer and a display panel provided with reflecting areas. In this case, the first reflecting means are to be implemented in such a way that the light reflected by the display panels does not change its direction of polarization upon reflection on the first reflecting means, while the direction of polarization of the light reflected by the polarizer should be converted.

Figure 10:
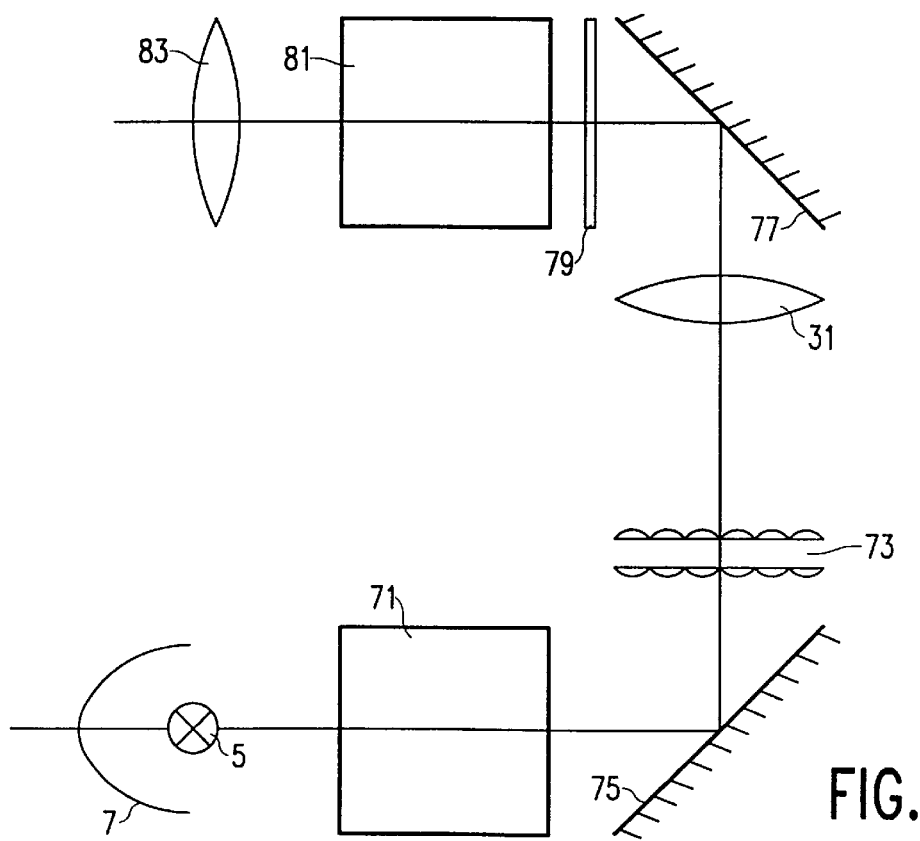
FIGS. 9 and 10 each show an embodiment of a color image projection device including an image projection module according to the invention, with three monochrome display panels.

Instead of using separate dichroic mirrors for the color recombination, the recombination system may be implemented as a prism system in which the dichroic mirrors cross each other. In this way, the mirrors may be very plane because they are present oil a relatively thick and polished substrate. Moreover, notably in a miniaturized image projection system, the interface between the two dichroic mirrors will be substantially invisible because the illumination beam has a relatively high divergence in such systems. FIG. 10 shows all embodiment thereof.

FIG. 10 is a side elevational view of an image projection device 1 with an image projection module in which the present invention can be used. The unpolarized light emitted by the radiation source 5 is incident on a dichroic cross 71 which ensures that three color channels, one for each of the primary colors, are realized. The dichroic cross 71 may comprise dichroic mirrors in air, because the imaging properties are less important in this case. The Figure shows only one color channel. The two other color channels are present above and below the plane of the drawing. Each color channel accommodates a first mirror 75 for folding the light path. The light subsequently passes an integrator system 73 and goes to the display panel 79 via a lens system 31 and a second mirror 77. After the light in each of the color channels is modulated by the relevant display panel, it is recombined by a second dichroic prism 81 so as to be subsequently projected by a projection lens system 83.

Since the operating principle for the second opportunity of light, which is incident at the unwanted position on the display panel or has the unwanted optical property of contributing to the formation of the image within each of the color channels, is analogous to what has been described hereinbefore for the light path in the image projection module, reference is made to the above descriptions of the Figures.

Each light path in the three color channels may be implemented in accordance with the present invention. The advantage of the embodiment as described in FIG. 10 is that there are no dichroic mirrors between the second lens plate and the exit window of the illumination system.

Figure 11:
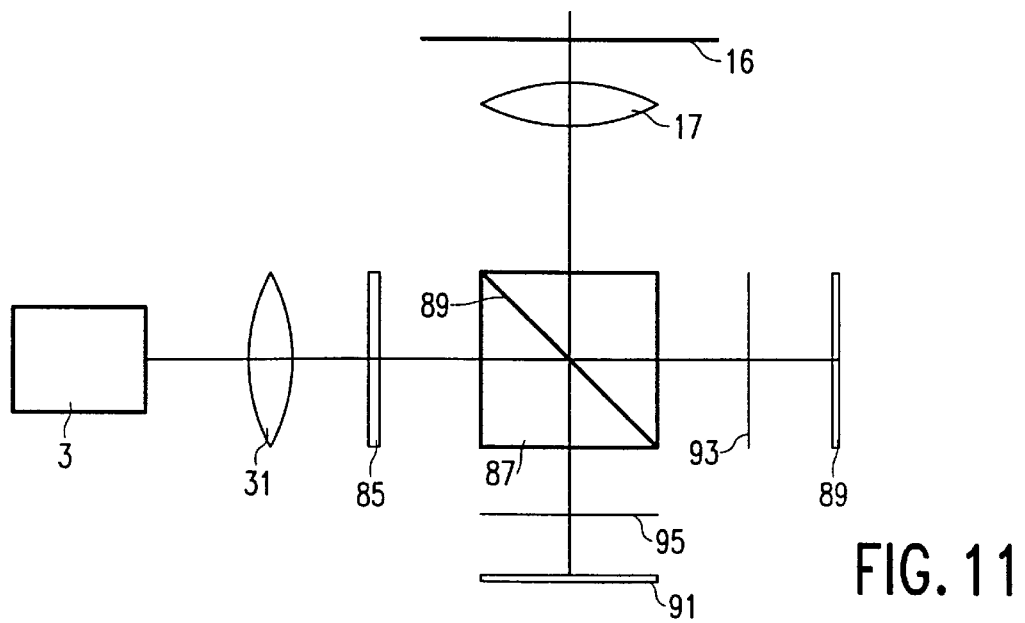

FIG. 11 shows another embodiment of an image projection device according to the invention, in which the display panels are reflective display panels. The unpolarized light coming from the illumination system 3 is incident on a polarizing beam splitter 87 via the lens system 31 and a λ/4 plate 85. One direction of polarization is passed at the interface 89 in the beam splitter 87, whereas the other direction of polarization of the beam from the light source is deflected. The embodiment shown in FIG. 11 has two display panels 89, 91. The display panels are of the reflective type. The display panel 89 is, for example, a panel which modulates only red light. To limit loss of light, a dichroic mirror 93 passing only red light and reflecting green and blue light is arranged in front of the display panel 89. As a result of the modulation, the direction of polarization of the red light may change and, consequently, the light which has changed its direction of polarization will be deflected towards the projection lens 17. The display panel 91 is, for example, a panel modulating both blue and green light. A dichroic mirror 95 passing green and blue light and reflecting red light precedes the display panel 91. Also in this case, the direction of polarization will be changed due to the modulation, so that the beam splitter 87 will pass the modulated light towards the projection lens 17.

The display panel 91 may be a panel in which the pixels are provided with blue and green transmissive filters. Alternatively, the display panel may time-sequentially modulate the blue and green beams with image information, with the light which is imaged on the screen via this panel being time-synchronized and only the green and blue light being blocked.

An advantage of such an embodiment, in which one display panel is used for two colors and a second display panel is used for the third color, is that a high resolution in the color of the monochrome display panel, or an optimization of the spectral efficiency of the lamp can be achieved. The three colors may of course be distributed oil the two display panels in different manners.

It is alternatively possible to use one three-color panel in combination with a monochrome display panel. In this case, the dichroic mirror preceding the color panel may be dispensed with. Such a combination provides the possibility of realizing extra luminance at the peak luminance of a given color.

Other possible combinations are two three-color panels or one three-color panel and one black-white panel.

In all embodiments described hereinbefore, the light paths may be implemented similarly as in the image projection module according to the invention. In this case, the positions on the first reflecting means, at which the light reflected by the display panel arrives, should also maintain their polarization.

All of the FIGS. 2, 5(a), 5(b), 5(c), 7, 8, 9 and 10 have been described with reference to an integrator system comprising two lens plates, bait they may alternatively have an integrator system constituted as an optically transparent bar.

We claim:

1. An image projection module comprising, in this order, an illumination system including a radiation source and an image display system having at least one display panel for modulating an illumination beam to be supplied by the illumination system with image information, the illumination system comprising an integrator system having an exit surface which is situated in an exit plane, wherein first reflecting means are present in the exit plane of the integrator system, and second reflecting means are present in the module on an exit side of the integrator system, and an optical system for at least partly imaging the exit surface of the integrator system via the second reflecting means on the first reflecting means is arranged between the first reflecting means and the second reflecting means.

2. An image projection module as claimed in claim 1, wherein the integrator system comprises a first and a second lens plate, the lenses of the second lens plate jointly constituting the exit surface of the integrator system.

3. An image projection module as claimed in claim 2, wherein the first reflecting means is comprise reflecting areas which are present on the second lens plate.

4. An image projection module as claimed in claim 2, wherein the first reflecting means have at least one reflecting element adjoining the second lens plate and being situated in the exit plane of the integrator system.

5. An image projection module as claimed in claim 1, wherein the integrator system comprises an optically transparent bar whose end face remote from the radiation source constitutes the exit surface of the integrator system.

6. An image projection module as claimed in claim 5, wherein the first reflecting means have at least one reflecting element adjoining the end face of the bar and being situated in the exit plane of the integrator system.

7. An image projection module as claimed in claim 1, wherein the plane of the second reflecting means encloses all angle different from 90° with the optical axis, and the optical system comprises a first and a second lens, the image of the exit surface of the integrator system created by the first lens being situated in the focal plane of the second lens.

8. An image projection module as claimed in claim 1, wherein the second reflecting means have reflecting areas which are at least partly integrated with the display panel.

9. An image projection module as claimed in claim 1, wherein the second reflecting means comprise a pattern of dichroic reflecting elements, which pattern corresponds to the pattern of the pixels of the display panel.

10. An image projection module as claimed in claim 9, wherein a microlens array is arranged at an illumination side of the display panel, the dichroic elements being situated in a focal plane of the microlens array.

11. An image projection module as claimed in claim 9, wherein a microlens array is situated at an illumination side of the display panel, the dichroic elements being arranged on the microlens array.

12. An image projection module as claimed in claim 8, wherein the second reflecting means have a plurality of reflecting areas which at least partly coincide with passive pixel portions of the display panel.

13. An image projection module as claimed in claim 8, wherein the exit plane of the integrator system is substantially parallel to the second reflecting means, and in that the reflecting portion in the exit plane of the integrator system covers a surface which is twice as large as the exit surface.

14. An image projection module as claimed in claim 8, wherein the exit plane of the integrator system is substantially parallel to the second reflecting means, and in that the reflecting portion in the exit plane of the integrator system covers a surface which is three times as large the exit surface.

15. An image projection module as claimed in claim 1, wherein the second reflecting means comprise a reflective polarizer which is arranged between the illumination system and the display panel, and in that polarization-converting means are present on or proximate to the first reflecting means.

16. An image projection module as claimed in claim 15, wherein the polarizer is a linear retro-directive polarizer.

17. An image projection module as claimed in claim 15, wherein the polarizer is a cholesteric polarizer.

18. An image projection module as claimed in claim 15, wherein the polarizer is a polarizing beam splitter.

19. An image projection module as claimed in claim 16, in which the second reflecting means are only constituted by the linear polarizer, wherein the first reflecting means are specularly reflecting and in that a $\lambda/4$ plate is present on or proximate to the first reflecting means.

20. An image projection module as claimed in claim 16, in which the second reflecting means comprise the linear polarizer and have reflecting areas on or proximate to the display panel, wherein a $\lambda/4$ plate is present in the light path of the light reflected on the linear polarizer, and the first reflecting means are specularly reflecting at least at positions where light reflected by the linear polarizer is incident.

21. An image projection module as claimed in claim 17, in which the second reflecting means are constituted by the cholesteric polarizer only, wherein the first reflecting means are specular.

22. An image projection module as claimed in claim 17, in which the second reflecting means comprise a cholesteric polarizer and have reflecting areas on or proximate to the display panel, wherein a $\lambda/4$ plate on or proximate to the first reflecting means is present in the light path of the light reflected on the reflecting areas.

23. An image projection module as claimed in claim 17, in which the second reflecting means comprise a cholesteric polarizer and have reflecting areas on or proximate to the display panel, wherein cholesteric elements having a direction of rotation opposite to that of the cholesteric polarizer and situated on or proximate to the first reflecting means are present in the light path of the light reflected on the reflecting areas.

24. An image projection module as claimed in claim 15, in which the second reflecting means have reflecting areas on or proximate to the display panel, wherein both the plane of the reflective polarizer, on the one hand, and the plane of the reflecting areas and the display panel, on the other hand, enclose an angle different from 90° with the optical axis and also mutually enclose an angle.

25. An image projection module as claimed in claim 17, wherein the cholesteric polarizer comprises a single layer of a liquid crystalline polymer material, within which layer the pitch of the molecular helix varies between two values which correspond to the lower limit and the tipper limit, respectively, of the reflection band required to cover at least the full visible wavelength range.

26. An image projection module as claimed in claim 17, wherein a $\lambda/4$ plate is present between the cholesteric polarizer and the display panel.

27. An image projection module as claimed in claim 1, in which the integrator system comprises a first and a second lens plate, wherein the second lens plate is semi-circular or quarter-circular, the illumination system being adapted to supply a semi-circular or quarter-circular illumination beam, respectively, at the location of the second lens plate.

28. An image projection module as claimed in claim 1, in which the integrator system comprises a first and a second lens plate, wherein the lenses of the first lens plate have an aspect ratio which corresponds to that of the display panel.

29. An image projection module comprising an illumination system and an image display system for modulating an illumination beam supplied by the illumination system, wherein the image display system comprises two display panels, one of the display panels being suitable for modulating a monochrome light beam and the other display panel being suitable for modulating at least two different monochrome light beams, said display panels being preceded by a dichroic filter having a transmission wavelength which corresponds to the wavelength of the light beam to be modulated by the relevant display panel, and each light path between the radiation source and the relevant display panel being implemented similarly as the light path between the radiation source and the display panel as claimed in claim 1.

30. An image projection module comprising an illumination system and an image display system for modulating an illumination beam supplied by the illumination system, wherein the image display system comprises two color display panels, in which each light path between the radiation source and the relevant color display panel is implemented similarly as the light path between the radiation source and the display panel as claimed claim 1.

31. An image projection module comprising an illumination system and an image display system for modulating an illumination beam supplied by the illumination system, in which the image display system comprises three monochrome display panels and the image projection module is provided with means for realizing three color channels, one per monochrome display panel, by separating the light beam from the illumination system into three primary sub-beams, and further provided with means for recombining said sub-beams after modulation by the respective display panels, wherein each color channel is implemented similarly as the light path between the radiation source and the display panel of the image projection module as claimed in claim 1.

32. An image projection module as claimed in claim 31, wherein the means for recombining the modulated monochrome sub-beams is constituted by a dichroic prism system comprising two dichroic mirrors which cross each other.

33. An image projection module as claimed in claim 1, wherein the image display system is a reflective image display system.

34. An image projection device comprising an illumination system and an image display system jointly constituting an image projection module, and further provided with a projection lens system, wherein the image projection module is implemented as claimed in claim 7.

35. An image projection device as claimed in claim 34, wherein a third lens for imaging the exit plane of the integrator system in the entrance pupil of the projection lens system is present between the second lens and the projection lens system.

36. An image projection device as claimed in claim 35, in which the second reflecting means comprise a cholesteric polarizer, wherein the cholesteric polarizer is arranged between the second and the third lens.

37. An image projection device comprising an illumination system and an image display system jointly constituting an image projection module, and further provided with a projection lens system, wherein the image projection module is implemented as claimed in claim 1.

* * * * *